United States Patent [19]

Iida et al.

[11] Patent Number: 5,182,915
[45] Date of Patent: Feb. 2, 1993

[54] PORTABLE TYPE AIR CONDITIONING APPARATUS

[75] Inventors: Tadasato Iida; Fusakichi Takahashi; Kouji Wada; Toshiro Nigo, all of Shizuoka, Japan

[73] Assignee: Kabushiki Kaisha Toshiba, Kanagawa, Japan

[21] Appl. No.: 803,092

[22] Filed: Dec. 5, 1991

Related U.S. Application Data

[63] Continuation of Ser. No. 628,589, Dec. 17, 1990, Pat. No. 5,099,625.

[30] Foreign Application Priority Data

Dec. 20, 1989 [JP] Japan ................. 1-328250
Dec. 21, 1989 [JP] Japan ................. 1-329604
Jan. 17, 1990 [JP] Japan ................. 2-007541

[51] Int. Cl.⁵ .......................................... F25B 1/00
[52] U.S. Cl. .................................. 62/89; 62/180; 62/228.4; 62/305
[58] Field of Search ............ 62/228.3, 228.4, 180, 62/305, 228.1, 89

[56] References Cited

U.S. PATENT DOCUMENTS 3,278,111 10/1966 Parker ....................... 417/32
4,220,010 9/1980 Mueller et al. ............... 62/126

FOREIGN PATENT DOCUMENTS 0029853 2/1987 Japan ................. 62/228.4
0256764 10/1989 Japan ................. 62/228.1
2209828A 5/1989 United Kingdom .

OTHER PUBLICATIONS

Patent Abstracts of Japan, vol. 7, No. 244 (M-252)[389], 28, Oct. 1983; and JP-A-58 129 121 (Tokyo Shibaura Denki K.K.), Jan. 8, 1983.

Primary Examiner—William E. Wayner
Attorney, Agent, or Firm—Limbach & Limbach

[57] ABSTRACT

A portable air conditioning apparatus includes a refrigerating circuit comprising a variable capacity compressor and a condenser cooled by water fed from a water tank and a flow of air generated by a fan device, an inverter for outputting a variable driving frequency to the compressor, and a control section for controlling the frequency of the inverter in response to an air conditioning load in a defined space. The control section has a frequency control function by which the driving frequency of the inverter is forcibly decreased irrespective of the air conditioning load to reduce the consumption of water at the condenser when an amount of water is detected to be below a prescribed value in the water tank.

13 Claims, 9 Drawing Sheets

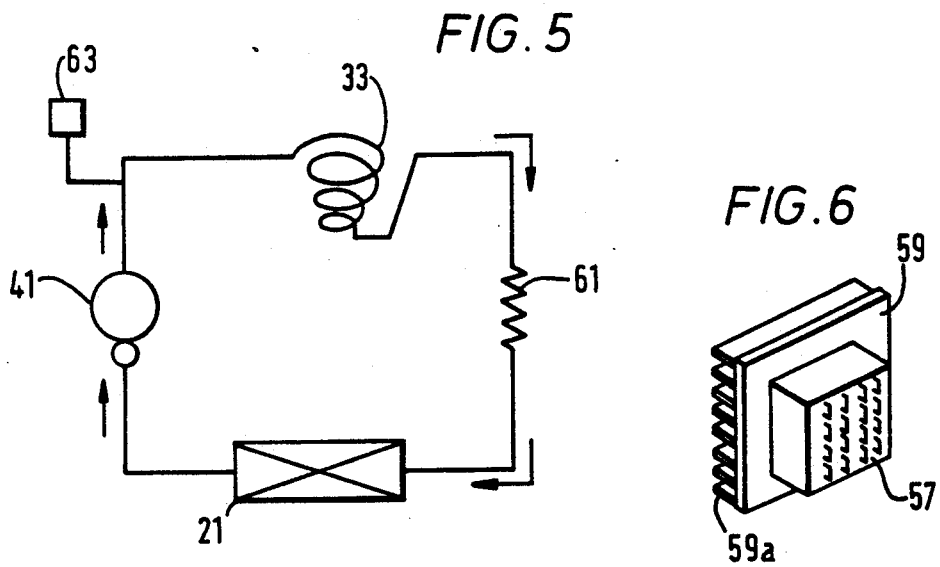
FIG. 5
FIG. 6
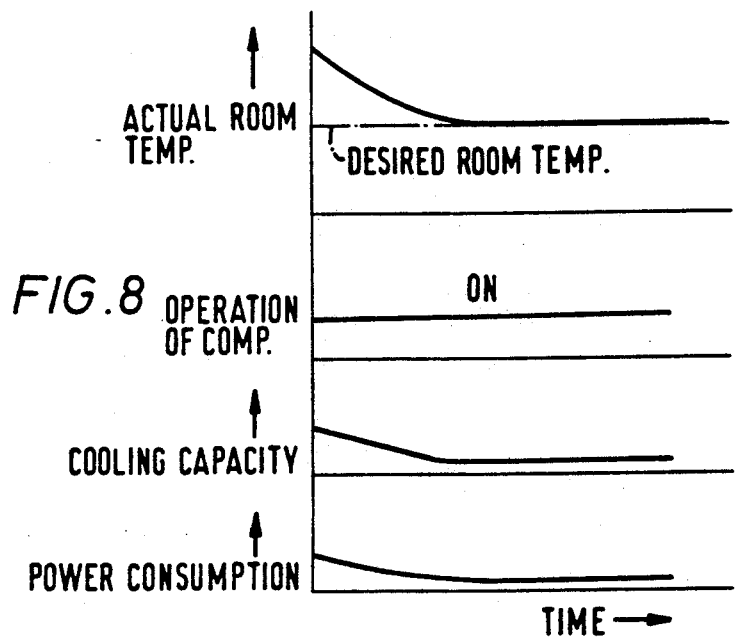
FIG. 8
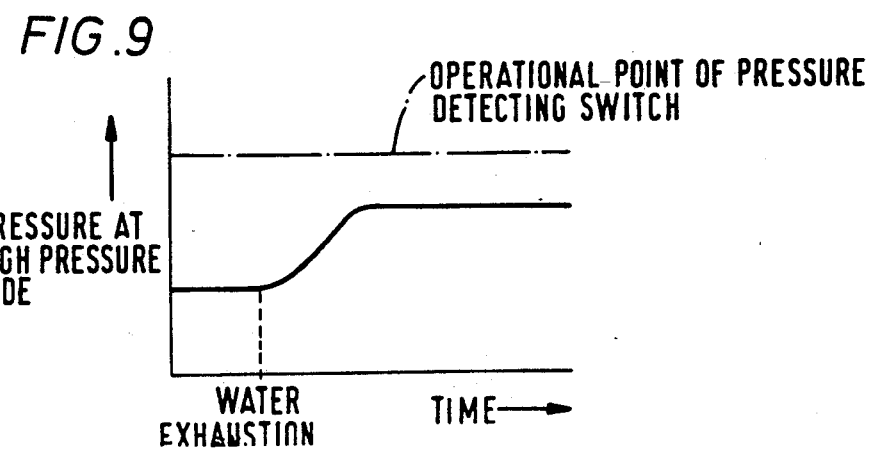
FIG. 9

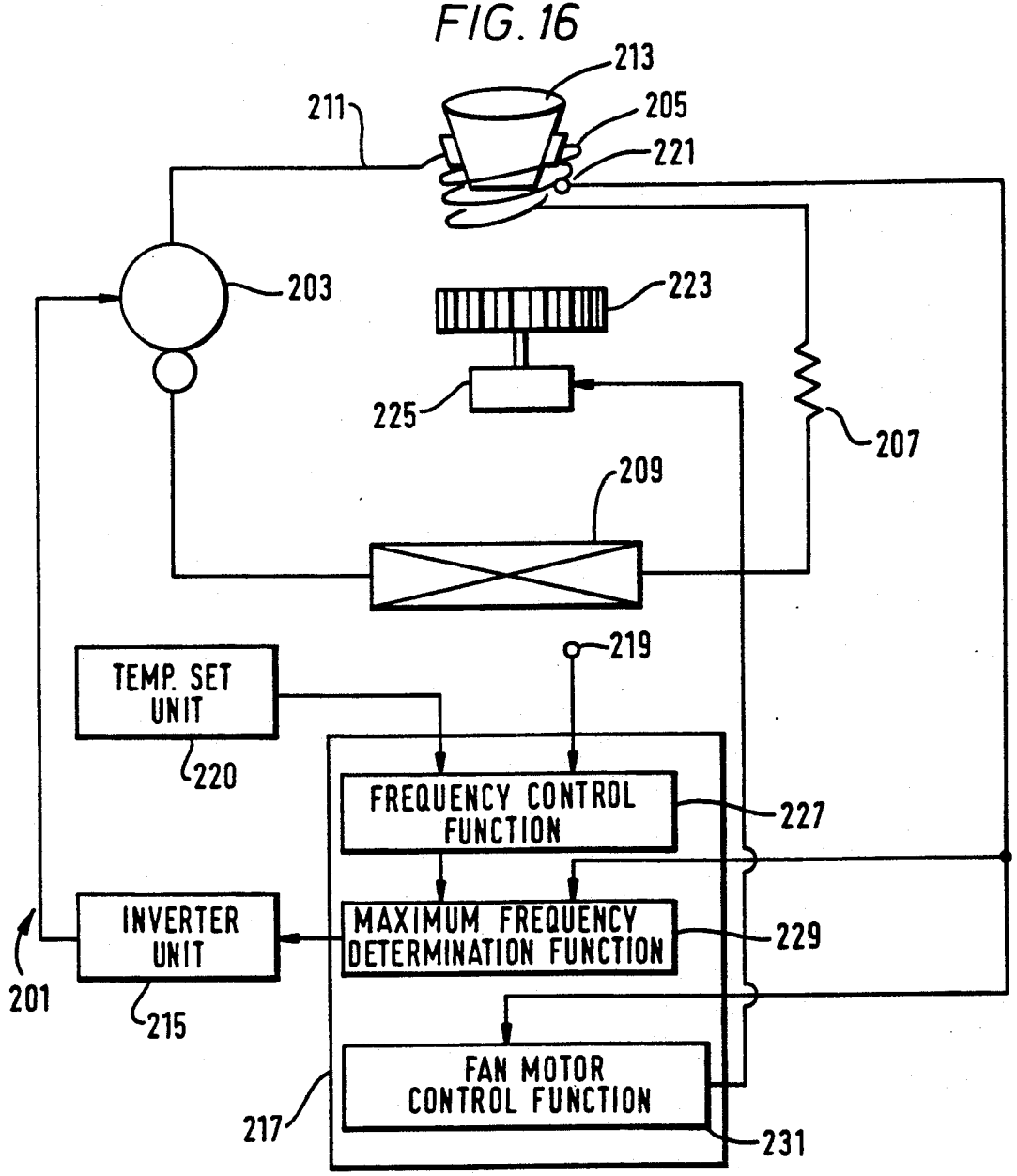

PORTABLE TYPE AIR CONDITIONING APPARATUS

This is a continuation of application Ser. No. 07/628,589, filed Dec. 17, 1990, now U.S. Pat. No. 5,099,625.

BACKGROUND OF THE INVENTION

1. Field of the invention

The present invention relates, in general, to air conditioning apparatus. In particular, the invention relates to a portable type air conditioning apparatus which includes a condenser cooled with air and water.

2. Description of the related art

A portable type air conditioning apparatus which can be moved room to room is well known, as a so-called set-free type air conditioner. The portable air conditioning apparatus typically includes a compressor, an evaporator and a condenser cooled by air and water (hereinafter referred to as a water-air cooled condenser). The portable type air conditioning apparatus also includes a water tank and a water spray device to provide water to the water-air cooled condenser. Thus, air in the room to be cooled is taken into the casing through a first air intake opening formed at the rear-upper portion of the casing. The air is cooled by the evaporator and is finally discharged to the room from an air supply opening formed at the front side of the casing.

In the above-described conventional air conditioning apparatus, air in the room is also taken into the casing through a second air intake opening formed at the rear-lower portion of the casing. The air taken into the casing flows through the water-air cooled condenser. Water stored in the water tank is also sprayed on the water-air cooled condenser. Thus, the water-air cooled condenser is cooled by the air and the water. The air flowing through the water-air cooled condenser is then exhausted to the outside of the room through a duct.

The operation of the above-described conventional air conditioning apparatus is shown in FIG. 1. The actual temperature in the room is compared with a set room temperature and the compressor is controlled on and off in response to the comparison result. The cooling capacity of the compressor is gradually increased after the compressor is energized and is rapidly decreased to zero when the compressor is de-energized. The power consumption of the compressor becomes a rated value when the compressor is energized and goes to zero when the compressor is de-energized.

In the above-described air conditioning apparatus, the pressure of the high-pressure side of the refrigerating circuit increases excessively when water in the water tank is exhausted, An increase in pressure of the high-pressure side of the refrigerating circuit adversely affects the operational life of the refrigerating circuit elements. A pressure detecting switch is used to avoid an excessive increase in pressure of the high-pressure side of the refrigerating circuit. As shown in FIG. 2, if the pressure of the high-pressure side increases above a prescribed value due to a shortage of water stored in the water tank, the pressure detecting switch is activated to stop the operation of the air conditioning apparatus, i.e., the compressor.

However, since, in general, a water consumption is increased in summer season, the air conditioning apparatus may frequently be stopped because of the late replenishment of water to the water tank during the operation.

SUMMARY OF THE INVENTION

Accordingly, it is an object of the present invention to decrease the consumption of water at the water-air cooled condenser of a portable type air conditioning apparatus when the amount of water is detected to be below a prescribed level in the water tank.

It is another object of the invention to maintain the operation of a portable type air conditioning apparatus even if the water in the water tank is exhausted.

It is still another object of the invention to avoid frequent stopping of the operation of a portable type air conditioning apparatus caused by the activation of a pressure detecting switch.

According to one aspect of the present invention, a portable air conditioning apparatus includes a variable capacity compressing unit for compressing refrigerant, a condenser cooled by water and air for condensing the refrigerant, a water supply unit for supplying water to the condenser, a water level detecting unit for detecting an amount of water stored in the water supply unit, and a control unit for decreasing the water consumption of the condenser when the amount of the water in the water supply unit reaches a prescribed value.

The control unit may include an inverter for supplying a target driving frequency corresponding to the air conditioning load in a defined space to be air-conditioned to the variable capacity compressing unit, and a decrease function for forcibly decreasing the target driving frequency output from the inverter irrespective of the air conditioning load when the amount of the water in the water supply unit reaches a prescribed value.

According to another aspect of the invention, a portable air conditioning apparatus having a refrigerating circuit includes a variable capacity compressing unit for compressing refrigerant, a condenser cooled by water and air for condensing the refrigerant, a water supply unit for for supplying water to the condenser, a refrigerant temperature detecting unit for detecting the temperature of refrigerant at the high pressure side of the refrigerating circuit, a control unit for modifying the capacity of the compressing unit and maintaining the operation of the compressing unit when the temperature of the refrigerant greater than a prescribed value at the high pressure side of the refrigerating circuit is detected.

The control unit may include an inverter for supplying a target driving frequency corresponding to the air conditioning load to the variable capacity compressing unit, and a decrease function for forcibly decreasing the target driving frequency output from the inverter irrespective of the air conditioning load when the temperature of the refrigerant greater than the prescribed value at the high pressure side is detected.

The control unit may also include an inverter for supplying a target driving frequency corresponding to the air conditioning load to the variable capacity compressing unit, a determining function for determining a maximum driving frequency of the inverter based on the detection result of the refrigerant temperature detecting unit, and a changing function for changing the target driving frequency output from the inverter to the maximum driving frequency to extend the operation of the compressing unit if the target driving frequency is greater than the maximum driving frequency.

BRIEF DESCRIPTION OF THE DRAWINGS

These and other objects and advantages of this invention will become more apparent and more readily appreciated from the following detailed description of the presently preferred embodiment of the invention, read in conjunction with the accompanying drawings wherein:

FIG. 5 is a schematic view illustrating a refrigerating circuit used in the portable type air conditioning apparatus shown in FIG. 3;

FIG. 6 is an enlarged perspective view illustrating switching elements of an inverter unit mounted on the heat radiation plate in the portable type air conditioning apparatus shown in FIG. 4;

FIG. 8 is a graph showing the operation of the portable type air conditioning apparatus of the one embodiment;

FIG. 9 is a graph showing changes in the pressure of the high-pressure side of the refrigerating circuit shown in FIG. 5;

FIG. 16 is a block diagram showing the refrigerating circuit and the control circuits of a portable type air conditioning apparatus of a third embodiment;

DETAILED DESCRIPTION OF THE PREFERRED EMBODIMENTS

Figure 1:
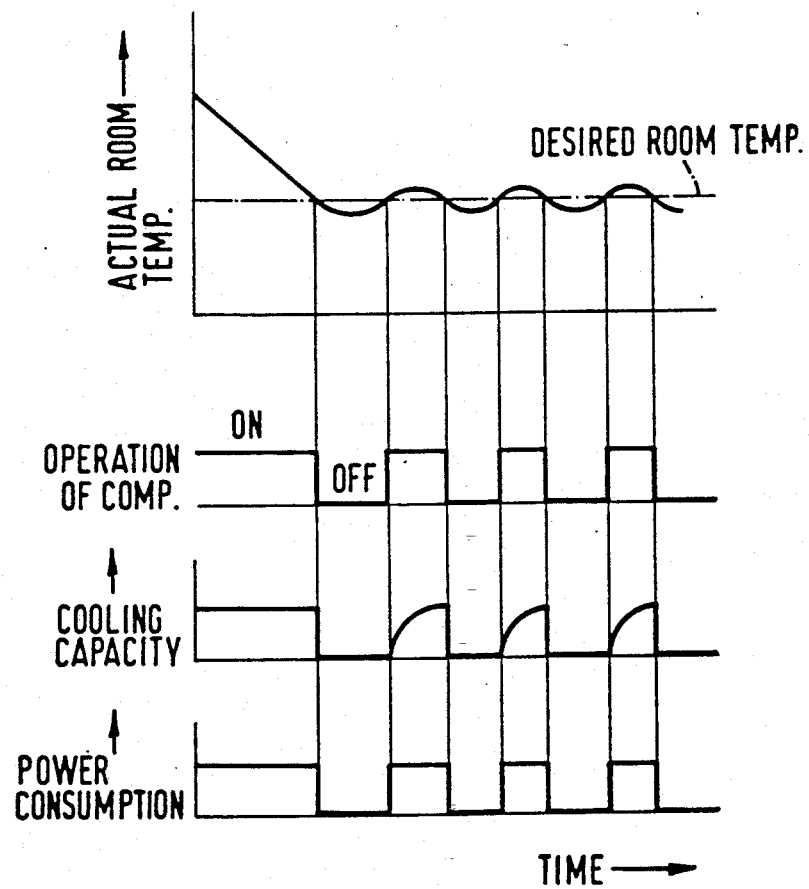
FIG. 1 is a graph showing the operation of a conventional portable type air conditioning apparatus.
Figure 2:
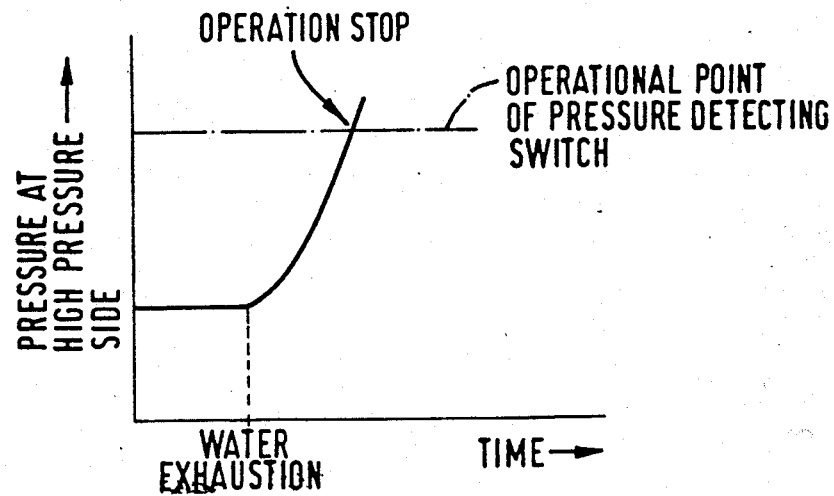
FIG. 2 is a graph showing changes in the pressure of the high-pressure side of the refrigerating circuit of the conventional portable type air conditioning apparatus.

Preferred embodiments of the present invention will be described in more detail with reference to the accompanying drawings. In the drawings, the same numerals are applied to the similar elements in the drawings, and therefore, the detailed descriptions thereof are not repeated.

Figure 3:
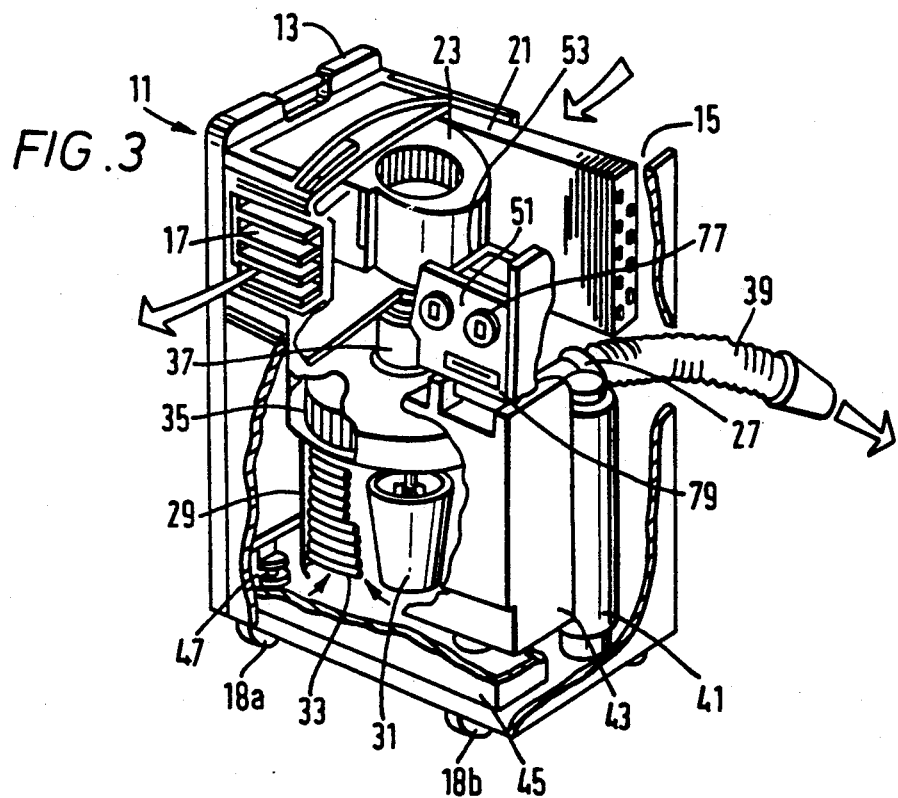
FIG. 3 is a perspective view partly in section illustrating a portable type air conditioning apparatus of one embodiment of the present invention.
Figure 4:
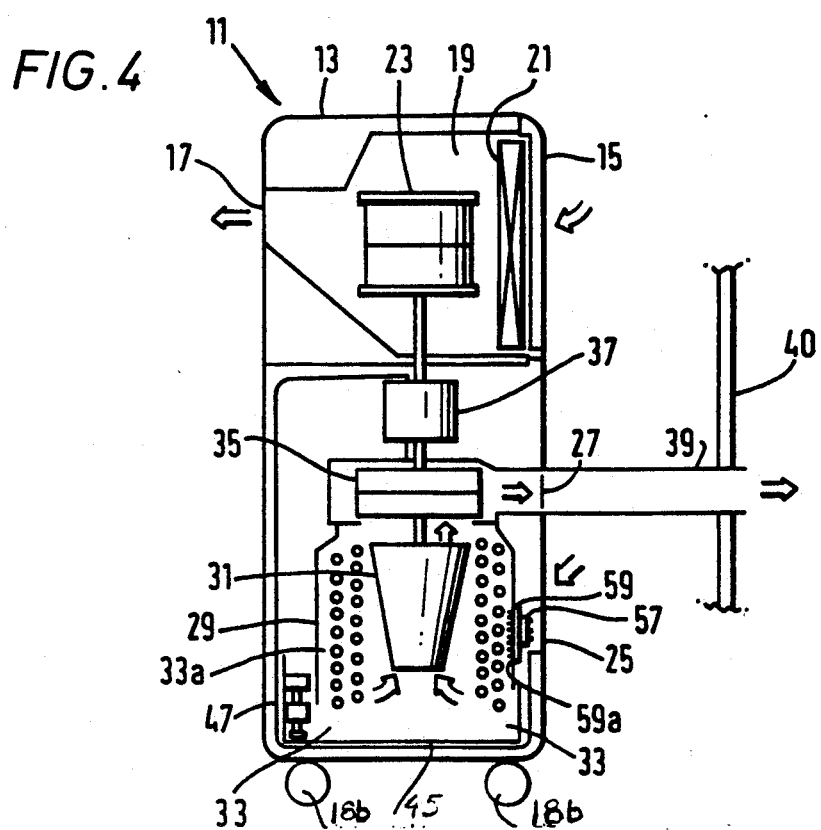
FIG. 4 is a sectional side view illustrating the portable type air conditioning apparatus shown in FIG. 3.

Referring to FIGS. 3 and 4, a portable air conditioning apparatus 11 includes a casing 13, which has an air intake opening 15 formed at a rear upper portion and an air discharge opening 17 formed at a front upper portion thereof. Two pairs of caster 18a and 18b are respectively arranged at opposite corners of the bottom rear surface of casing 13 to movably support casing 13. An air path 19 is formed between air intake opening 15 and air discharge opening 17 in casing 13.

An evaporator 21 is disposed in air path 19 so as to be opposite to air intake opening 15. A cooling fan 23 is rotatably arranged in a middle portion of air path 19.

As shown in FIG. 4, a second air intake opening 25 is formed at the rear lower portion of casing 13, and a second air discharge opening 27 is formed at a portion of casing 13 above second air intake opening 25.

A hollow-shaped air guide 29 is disposed in the lower portion of casing 13. The lower part of air guide 29 is opened and is communicated to second air intake opening 25 and the upper part of air guide 29 is connected to second air discharge opening 27. Thus, the air passage is formed from second air intake opening 25 to second air discharge opening 27 through air guide 29.

A conventional water spray 31 is disposed in air guide 29, and a water-air cooled condenser 33 is arranged around water spray 31. Water-air cooled condenser 33 is formed in a cylindrical shape by coiling a pipe 33a.

An exhausting fan 35 is disposed at the upper part of air guide 29, and the rotational shaft of fan 35 is connected to the rotational shaft of water spray 31, as shown in FIG. 4.

Cooling fan 23 is connected to one of the rotatable shafts of a two-shaft fan motor 37 arranged between air path 19 and air guide 29. Exhausting fan 35 also is connected to the other rotatable shaft of two-shaft fan motor 37.

One of the ends of a duct 39 is connected to second air discharge opening 27, and the other end thereof extends to the outside of the room through the wall 40 of the room.

A variable capacity compressor 41 is disposed on the bottom surface of casing 13, and a water tank 43 is also disposed adjacent to compressor 41. A water receiver 45 is arranged below water tank 43. Water stored in water tank 43 is supplied to water receiver by gravity from the water supply opening formed at the bottom surface of tank 43.

Water receiver 45 includes a rectangular-shaped pan extending below air guide 29 to guide water from water tank 41 to water spray 31. A float switch 47 is provided in water receiver 45 to detect the level of water stored in water receiver 45. Float switch 47 is diactivated if the level of water stored in water receiver 45 is below a prescribed level. Thus, float switch 47 also detectes the exhaustion of water stored in water tank 43 because of the fluid communication between water receiver 45 and water tank 43.

Figure 7:
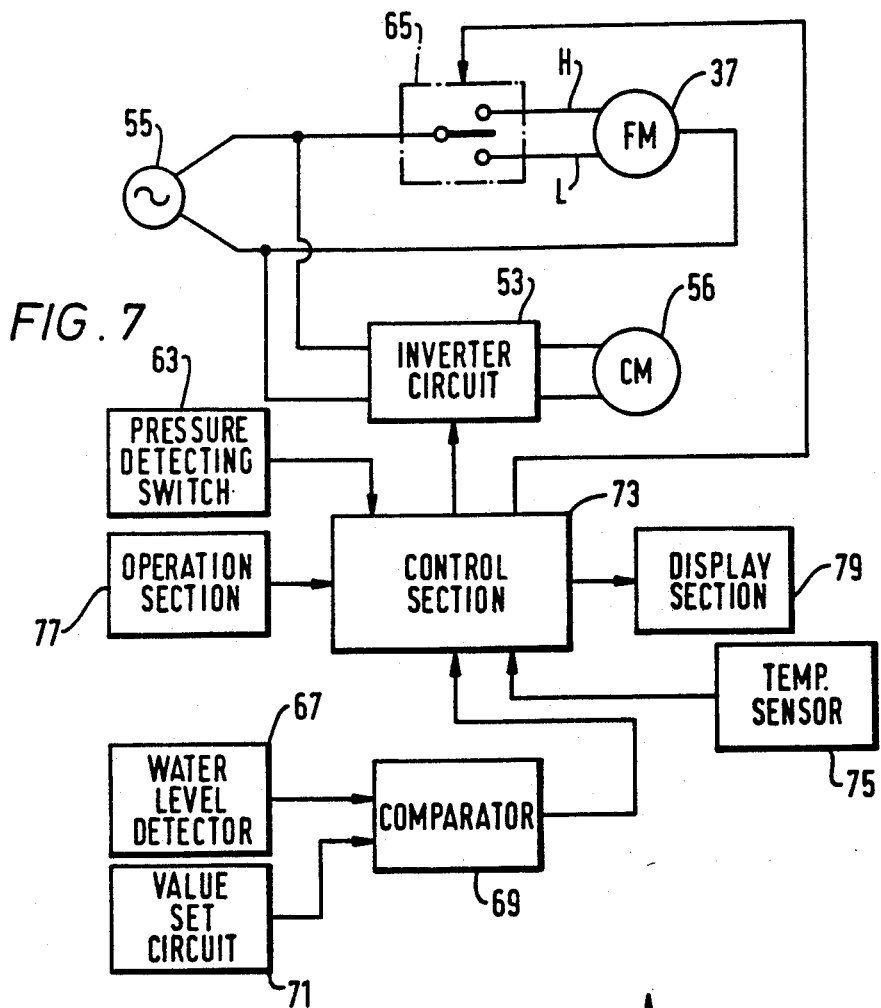
FIG. 7 is a block diagram of the portable type air conditioning apparatus of the one embodiment.

As shown in FIG. 3, a control panel 51 is arranged at the front upper surface of casing 13. An inverter circuit 53 shown in FIG. 7 and other control circuitries described hereafter are mounted on the backside of control panel 51. Inverter circuit 53 rectifies an AC voltage supplied from an AC power supply 55 to a DC voltage, and inverts the DC voltage to an AC voltage having a prescribed frequency, which is supplied, as a driving power, to a compressor motor 56 of variable capacity compressor 41, as shown in FIG. 7. Switching elements (Giant transistor) 57 of inverter circuit 53 are mechanically separated from inverter circuit 53. As shown in FIG. 6, switching elements 57 are integrally mounted on a heat radiation plate 59, which is attached to the outer surface of air guide 29. A plurality of heat radiation fins 59a projected from heat radiation plate 59 are exposed to the inside of air guide 29, as shown in FIG. 4.

As shown in FIG. 5, variable capacity compressor 41, water-air cooled condenser 33, a capillary tube 61 and evaporator 21 are connected in series to form a refrigerating circuit. A pressure detecting switch 63 is attached to a pipe extending between compressor 41 and water-air cooled condenser 33 (a high pressure side in the refrigerating circuit) to detect the pressure of refrigerant fed from compressor 41. Pressure detecting switch 63 is activated when the pressure of the high pressure side of the refrigerating circuit exceeds a prescribed value.

The control circuit of the above-described portable air conditioning apparatus will be described in more detail with reference to FIG. 7. Fan motor 37 is connected to AC power supply 55 through a fan speed control switch 65. Fan motor 37 has a high speed terminal H and a low speed terminal L. Fan speed control switch 65 operates to select either the high speed terminal H or the low speed terminal L.

A water level detector 67 includes float switch 47 shown in FIGS. 3 and 4 to detect the amount of water stored in water receiver 45. The detection result from water level detector 67 is fed to a comparator 69 to be compared with a prescribed value set by a value set circuit 71. A comparison result from comparator 69 is fed to a control section 73, which includes a microcomputer and its peripheral circuits. A temperature sensor 75 which detects an actual room temperature is connected to control section 73. Pressure detecting switch 63 is also connected to control section 73. An operation section 77 including at least an ON/OFF switch is connected to control section 73, and a display section 79 is also connected to control section 73 to indicate each operation status of air conditioning apparatus 11. Operation section 77 and display section 79 are generally mounted on the front side of control panel 51, as shown in FIG. 3.

Control section 73 performs a compressor control function in which an output frequency of inverter circuit 53 is controlled in response to a difference (air conditioning load) between the actual room temperature value detected by temperature sensor 75 and the desired room temperature value set by operation section 77. Control section 73 also performs a display function in which an exhaustion of water in water receiver 45 is indicated on display section 79, as a result of the comparison by comparator 69, to indicate the necessity of replenishment of water to water tank 43. Control section 73 carries out a high pressure protection function in which all of the operations of the air conditioning apparatus 11 including the operation of inverter circuit 53 are stopped when pressure detecting switch 63 is activated. Control section 73 further carries out a fan speed control function in which fan speed control switch 65 is selectively switched to either high speed terminal H or low speed terminal L in response to the air volume set operation by operation section 77 to control the rotational speed of fan motor 37.

The operation of the above-described embodiment will now be described.

The operation of air conditioning apparatus 11 is started after values necessary to the air conditioning operation are initialized through operation section 77. Control section 73 drives compressor motor 56 (compressor 41) through inverter circuit 53. Control section 73 also controls fan speed control switch 65 at either high speed terminal H or low speed terminal L on the basis of the air volume previously set by operation section 77 to drive fan motor 37 at a high or a low speed. When compressor motor 56 is driven, refrigerant is fed from compressor 41 and is circulated through water-air cooled condenser 33, capillary tube 61 and evaporator 41. When cooling fan 23 is rotated by fan motor 37, air in the room to be cooled is taken into casing 13 through air intake opening 15, and is cooled by evaporator 21. Then, the cooled air flows along air path 19, and is finally discharged to the room through air discharge opening 17. When exhausting fan 35 is rotated by fan motor 37, air in the room is taken into casing 13 through second air intake opening 25 and enters into air guide 29 to cool water-air cooled condenser 33. Then, the air is discharged to the outside of the room through second air discharge opening 27 and duct 39. At this time, water-air cooled condenser 33 is simultaneously cooled by water. When water spray 31 is rotated by fan motor 37, water stored in water receiver 45 is drawn into water spray 31, and then, the water in water spray 31 is centrifugally sprayed toward water-air cooled condenser 33. The sprayed water attaches to the surface of water-air cooled condenser 33, and is evaporated by the heat of water-air cooled condenser 33. Some amount of the sprayed water falls on heat radiating fins 59a to cool switching elements 57 of inverter circuit 53 through heat radiation plate 59. The remaining sprayed water is collected by water receiver 45 to be reused.

The operation of control section 73 will be further described. Control section 73 calculates the difference in temperature between the actual room temperature detected by temperature sensor 75 and the desired room temperature set by operation section 77 and controls the driving frequency output from inverter circuit 53 in response to the temperature difference (air conditioning load). If the actual room temperature is greater than the desired room temperature, the driving frequency from inverter circuit 53 is increased to increase the cooling capacity of compressor 41. On the other hand, the driving frequency from inverter circuit 53 is decreased to reduce the cooling capacity of compressor 41 as the actual room temperature approaches the desired room temperature. Thus, the cooling capacity of compressor 41 is controlled in response to changes in the air conditioning load in the room, and the actual room temperature in the room is smoothly changed to the desired room temperature. In this case, the cooling capacity (Q) of the air conditioning apparatus 11 is decreased, as the actual room temperature approaches the desired room temperature, as shown in FIG. 8. The power consumption (W) of the air conditioning apparatus 11 also is decreased, as the actual room temperature approaches the desired room temperature. Thus, the energy consumption efficiency (N) of the air conditioning apparatus 11 indicated by the practional expression (the cooling capacity (Q)/the power consumption (W)) is enhanced. When the energy consumption efficiency (N) is enhanced, the evaporation latent heat of water required for water-air cooled evaporator 33 is decreased, and thus, the number of water replenishment operation for water tank 43 is decreased because of the decrease in the water consumption.

As shown in FIGS. 3, 4 and 7, the level of water stored in water receiver 45 is detected by water level detector 67, and the output of comparator 69 becomes a low level when the level of water detected by water level detector 67 is below a prescribed value set by value set circuit 71. At this time, control circuit 73 overrides the above-described control based on the air conditioning load and forcibly decreases the driving frequency output from inverter circuit 53 to reduce the cooling capacity of compressor 41. At the same time, display section 79 indicates that the water level in water receiver 45 (water tank 43) is below the set value by the operation of a lamp, for example. Therefore, the cooling capacity of compressor 41 is forcibly decreased and the cooling capacity (Q) and the power consumption (W) also are reduced.

The amount of water consumption (C) is substantially proportional to a value corresponding to the amount of heat radiation from water-air cooled condenser 33, which is the sum of the cooling capacity (Q) and the power consumption (W).

As described above, since the cooling capacity of compressor 41 is forcibly decreased, the energy consumption efficiency (N) thereof is enhanced and the water consumption thereof is largely decreased. Thus, an increase in pressure of the high-pressure side of the refrigerating circuit shown in FIG. 5 is also restrained, as shown in FIG. 9.

With the above-described embodiment, since the water level below a prescribed value in water receiver 45 (water tank 43) is indicated by display section 79, e.g., a lamp, an occupant may carry out replenishment of water into water tank 43 before pressure detecting switch 63 is activated. Thus, the number of times compressor 41 stops in response to the activation of pressure detecting switch 63 is effectively decreased. In addition, since water in water receiver 45 is sprayed onto heat radiation fins 59a on which switching elements 57 of inverter circuit 53 are arranged, the heat radiation efficiency of switching elements 57 is enhanced and a stable operation of air conditioning apparatus 11 can be ensured. As shown in FIG. 4, heat radiation fins 59a of switching elements 57 are cooled by not only the water sprayed by water spray 31 but also the air flowing along air guide 29. A sufficient heat radiation from switching elements 57 is performed.

In the above-described embodiment, the water level below a prescribed value in water receiver 45 may be indicated by the operation of a buzzer arranged in display section 79. The remaining time before water tank 43 becomes empty may be indicated by display section 79, instead of the operation of the lamp or the buzzer. When the water consumption in water tank 43 is informed by a lamp, a plurality of different colored lamps may be used to indicate changes in water level in water tank 43. The plurality of different colored lamps may serially be operated in response to the decrease in water in water tank 43. In addition, the lamp may be switched on and off a prescribed time after the lamp is operated, and the switching rate of the lamp may be changed in response to the decrease in water in water tank 43.

Figure 10:
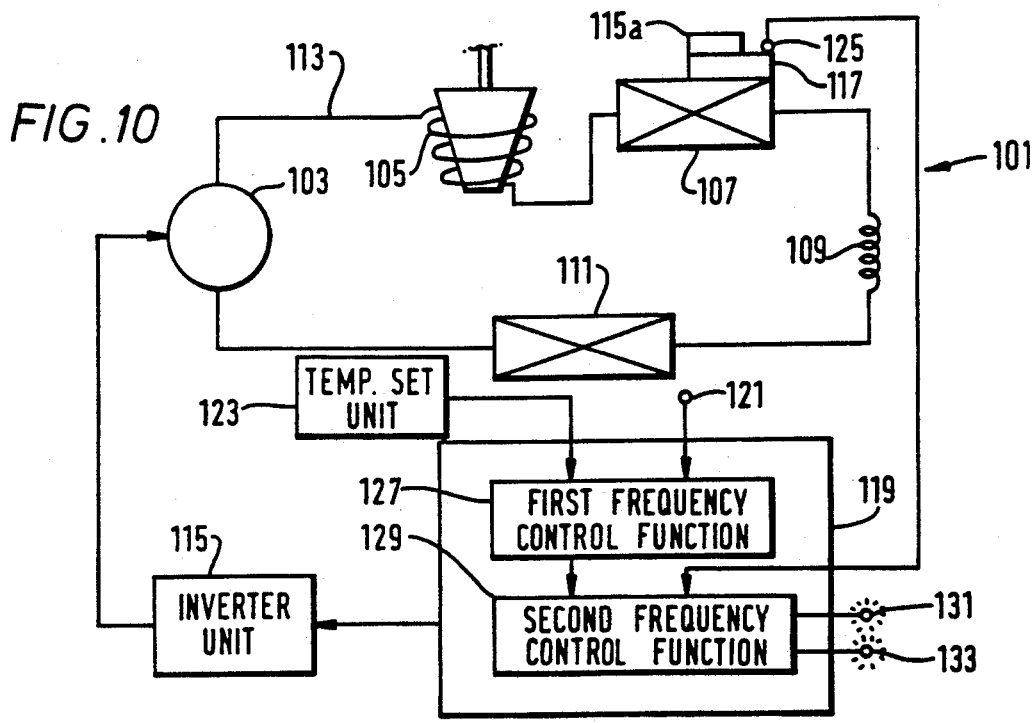
FIG. 10 is a block diagram showing the refrigerating circuit and the control circuits of a portable type air conditioning apparatus of a second embodiment.

A second embodiment of the present invention will now be described. As shown in FIG. 10, a refrigerating circuit 101 of this embodiment includes a variable capacity compressor 103, a water-air cooled condenser 105, an air cooled condenser 107, a capillary tube 109 and an evaporator 111 connected in series through a pipe 113. An inverter unit 115 is connected to a motor (not shown) of compressor 103 to control the rotational speed of the motor. Switching elements 115a of inverter unit 115 are mounted on air cooled condenser 107 through a heat radiation plate 117. The output frequency of inverter unit 115 is controlled by a control section 119. An actual room temperature sensor 121 is connected to control section 119. A temperature set unit 123 is connected to control section 119 to input a desired room temperature into control section 119. A temperature sensor 125 mounted on heat radiation plate 117 is connected to control section 119.

Temperature sensor 125 detects the temperature of air cooled condenser 103 to estimate the refrigerant temperature at a high pressure side of refrigerating circuit 101. Temperature sensor 125 may directly be mounted on air cooled condenser 107.

The above-described control section 119 is composed of a microcomputer and its peripheral circuits. Control section 119 includes first and second frequency control functions 127 and 129. When control section 119 executes first frequency control function 127, control section 119 calculates the air conditioning load in the room to be cooled on the basis of the temperature difference between the actual room temperature fed from actual room temperature sensor 121 and the desired room temperature set by temperature set unit 123, and controls the switching operation of inverter unit 115 to output a suitable driving frequency from inverter unit 115 to the motor of compressor 103. When control section 119 carries out second frequency control function 129, control section 119 decreases the driving frequency of inverter unit 115 set by first frequency control function 127 if the temperature of air cooled condenser 107 detected by temperature sensor 125 exceeds a prescribed value. In other words, when second frequency control function 129 is executed, the control operation by first frequency control function 127 is overridden and the operation of inverter unit 115 is controlled by second frequency control function 129.

Control section 119 also includes a water exhaustion indicating lamp 131 and an abnormal state indicating lamp 133 controlled by second frequency control function 129.

The construction of a portable air conditioning apparatus 135 of the second embodiment will now be described with reference to FIGS. 11 and 12. The inside of casing 137 is partitioned into an upper chamber 137a and a lower chamber 137b with a horizontal partition plate 139. An air discharge opening 141 is formed in the front surface of casing 137. An air intake opening 143 is formed in the rear surface of casing 137 exposed to upper chamber 137a. A fan casing 145 is arranged in upper chamber 137a and opens to air discharge opening 141. A cooling fan 147 is rotatably disposed in fan casing 145, and is supported by one of the rotatable shafts of a two-shaft motor 149 arranged in lower chamber 137b. A first evaporator 151a and a second evaporator 151b arranged parallel to first evaporator 151a are disposed in upper chamber 137a so as to be opposite to air intake opening 143. The above-described evaporator 111 includes first and second evaporators 151a and 151b.

An exhausting fan 153 and a water spray 155 are coaxially supported by the other rotatable shaft of two-shaft motor 149 in lower chamber 137b. Exhausting fan 153 is a centrifugal fan device and is disposed between two-shaft motor 149 and water spray 155. An exhausting fan casing 157 is arranged around exhausting fan 153. The above-described water-air cooled condenser 105 is arranged around water spray 155. A cylindrical cover 159 is disposed outside water-air cooled condenser 105. A water receiver 161 is disposed on the bottom surface of casing 137. The lower end of water spray 155 is dipped into water stored in water receiver 161.

Figure 12:
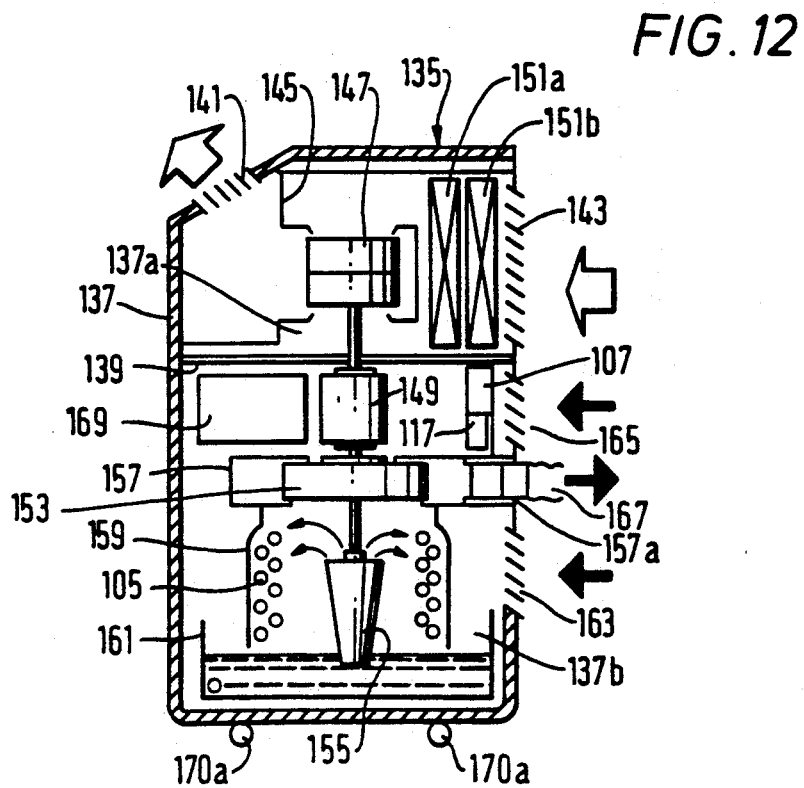
FIG. 12 is a sectional side view illustrating the portable type air conditioning apparatus shown in FIG. 11.

As shown in FIG. 12, a second air intake opening 163 is formed in the rear surface of casing 137 exposed to lower chamber 137b. A third air intake opening 165 is also formed in the rear surface of casing 137 between first and second air intake opening 143 and 163. The above-described air cooled condenser 107 is disposed in the lower chamber 137b so as to be opposite to third air intake opening 165. The above-described heat radiation plate 117 on which switching elements 115a of inverter unit 115 are mounted is also disposed opposite to third air intake opening 165. A flexible air guide hose 167 is inserted into an outlet 157a of exhausting fan casing 157 formed in rear surface of casing 137 to guide air from exhausting fan 153 to the external atmosphere. A box 169 in which control elements of control section 119 are housed is arranged in lower chamber 137b of casing 137. Two pairs of caster 170a and 170b are respectively provided at opposite corners of the rear bottom surface of casing 137 to movably support casing 137.

Figure 11:
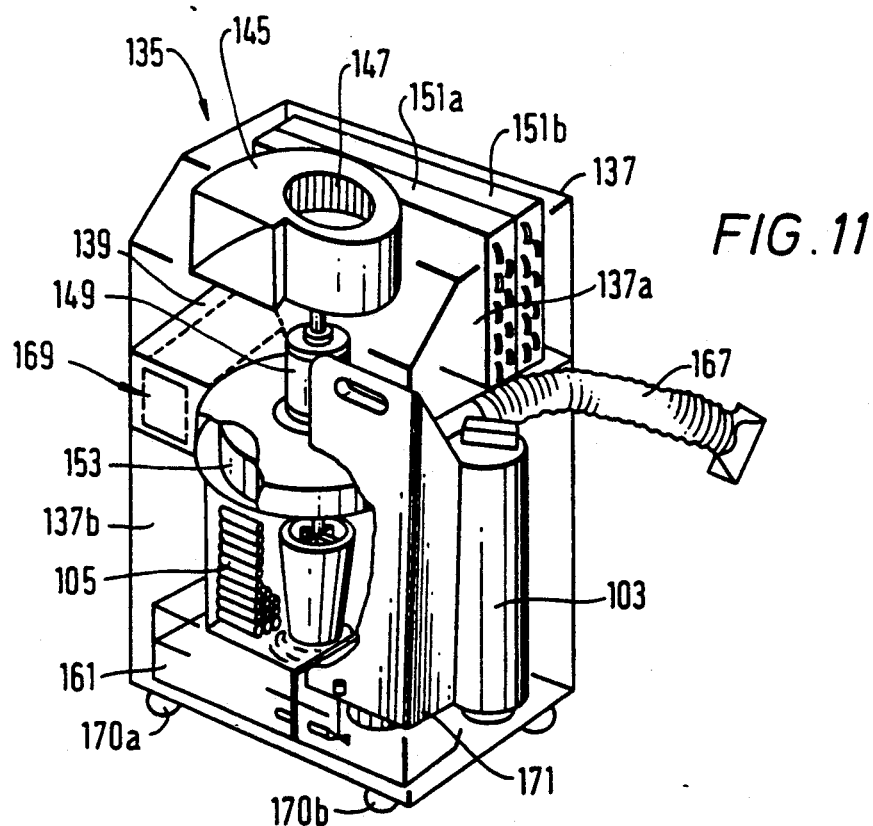
FIG. 11 is a perspective view partly in section illustrating a portable type air conditioning apparatus of the second embodiment.

As shown in FIG. 11, the above-described variable capacity compressor 103 is disposed on the bottom surface of casing 137, and a water tank 171 is also disposed adjacent to compressor 103. Water in water tank 171 is supplied to water receiver 161, as water in water receiver 161 is consumed.

A method for controlling the above-described portable air conditioning apparatus will be described with reference to FIG. 13. In the above-described first frequency control function 129, the driving frequency Fout (Hz) of inverter unit 115 determined by control section 119 is established based on the difference between the actual room temperature Ta (° C.) and the desired room temperature Ts (° C.), as shown in the following TABLE.

TABLE

| Ta-Ts (°C.) | | Fout (Hz) |
|---|---|---|
| above | 3 | 100 |
| 2 | 3 | 80 |
| 1 | 2 | 60 |
| 0 | 1 | 40 |
| −1 | 0 | 20 |
| below | −1 | 0 (OFF) |

Figure 13:
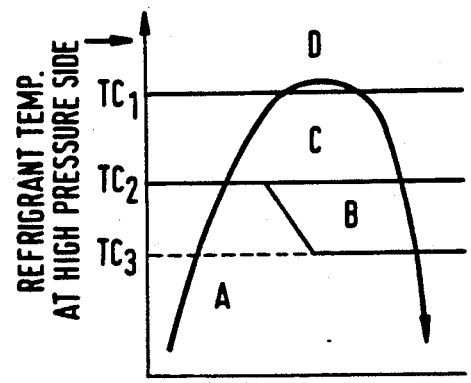
FIG. 13 is a graph showing the relationship of operation zones against predetermined temperature values of an air-cooled condenser shown in FIG. 10.

On the other hand, in the above-described second frequency control function 129, control section 119 compares the detected temperature Tc (° C.) of temperature sensor 125 with three different set temperatures Tc1, Tc2 and Tc3 shown in FIG. 13, and determines whether changes in detected temperature Tc ascend or descend. Based on the above-described comparison and the determination results, control section 119 finaly determines one of predetermined zones A, B, C or D to which the detected temperature Tc belongs. Thus, the air conditioning apparatus is controlled based on the determined zone A, B, C or D. In the predetermined zone A, since it is estimated that water in water receiver 161 is regularly sprayed onto water-air cooled condenser 105, the driving frequency Fout of inverter unit 115 selected from the TABLE by first frequency control function 127 is applied to the motor of compressor 103 without any modification. If detected temperature Tc from temperature sensor 125 exceeds one of set temperatures Tc2 and enters into the zone C, the driving frequency of inverter unit 115 is determined by subtracting 20 (Hz) from the present driving frequency regardless of the driving frequency Fout selected from the above-described TABLE by first frequency control function 127. This is because it is estimated that water in water receiver 161 is not regularly sprayed onto water-air cooled condenser 105. Furthermore, if the detected temperature Tc from temperature sensor 125 is still in the zone C thirty seconds after the motor of compressor 103 is driven with the above-described decreased driving frequency, the driving frequency of inverter unit 115 is further decreased by 20 (Hz). At this time, if the motor of compressor 103 has been driven by the driving frequency of 20 (Hz) output from inverter unit 115, the driving frequency of inverter unit 115 becomes zero and the motor of compressor 103 is stopped.

During the above-described control operation if the detected temperature Tc of temperature sensor 125 enters into the zone B defined between temperatures Tc2 and Tc3 from the zone C, the driving frequency from inverter unit 115 maintains the present value.

If the detected temperature Tc of temperature sensor 125 enters from the zone C to the zone D notwithstanding the above-described control operation is carried out, the driving frequency of inverter unit 115 is rendered zero (Hz), and thus, compressor 103 is stopped. This is because it may be estimated that the increase in the detected temperature Tc is caused by not only exhaustion of water in water tank 171 but also an abnormal operation of elements of the refrigerating circuit 101 shown in FIGS. 10, 11 and 12.

Figure 14:
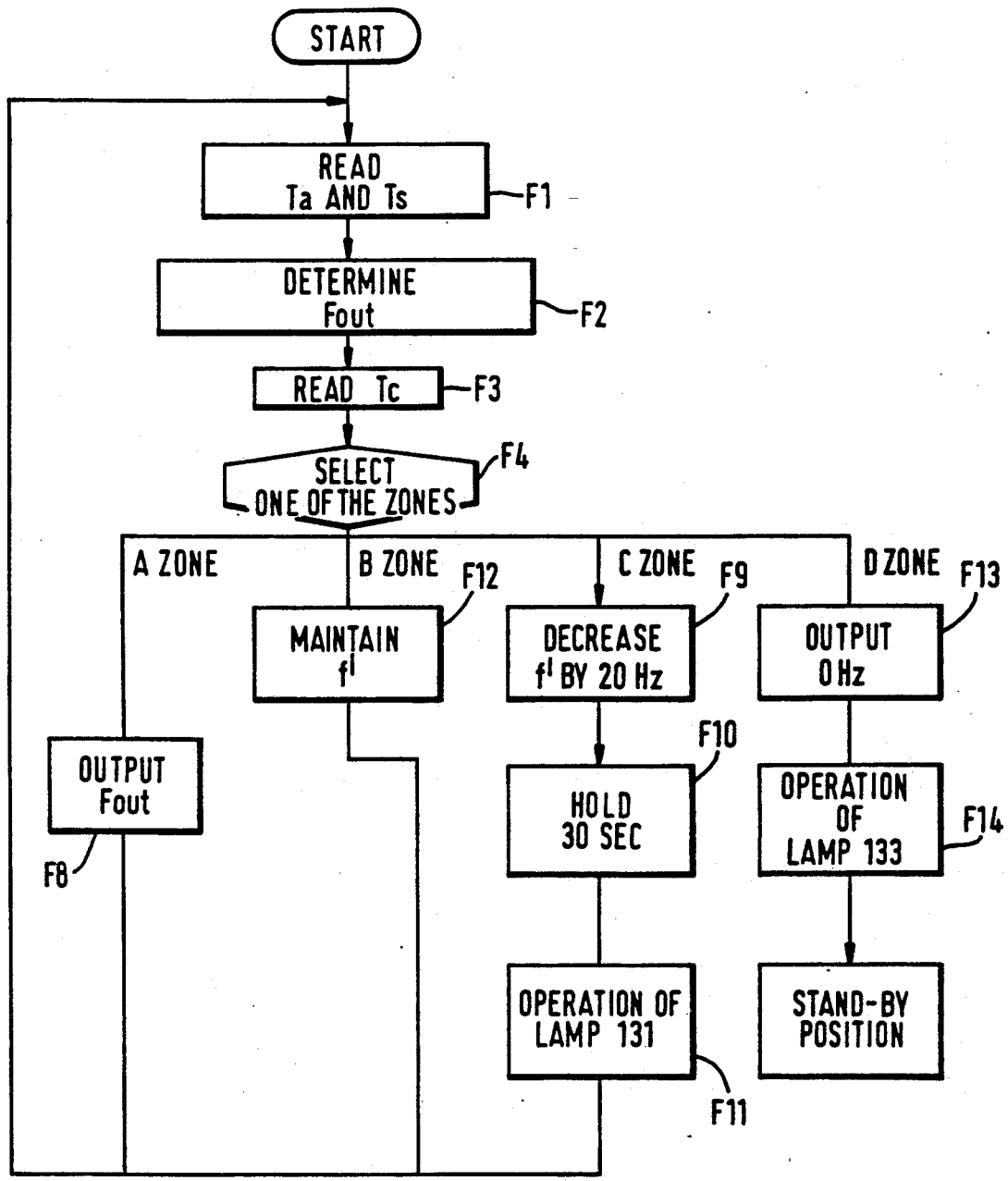
FIG. 14 is a flow chart showing the operation of the portable air conditioning apparatus of the second embodiment.

The operation of first and second frequency control functions 127 and 129 will be described in more detail with reference to FIG. 14. When the operation of the air conditioning apparatus 135 is started, the desired room temperature Ts from temperature set unit 123 and the actual room temperature Ta from actual room temperature sensor 121 are input into control section 119 (step F1). The driving frequency Fout of inverter unit 115 is selected from predetermined values shown in the above TABLE by first frequency control function 127 in accordance with the difference in temperature between desired room temperature Ts and actual room temperature Ta (step F2). Detected temperature Tc from temperature sensor 125 is input into control section 119 (step F3). In step F4, second frequency control function 129 determines one of the predetermined zones A, B, C or D to which detected temperature Tc belongs. If detected temperature Tc belongs to the zone A, in step F5 is executed. In step F5, the present driving frequency f' of inverter unit 115 is compared with the driving frequency Fout selected in step F2. If the present driving frequency f' is greater than the driving frequency Fout, the YES-path is taken. Present driving frequency f' is increased by 20 (Hz) in step F6, and the increased driving frequency f' is forcibly maintained for ten seconds (step F7), and then, the above-described steps F1, F2, F3 and F4 are re-executed. If the NO-path is taken in step F5, the present driving frequency f' is set to the driving frequency Fout selected in step F2 (in step F8). After that, the above-described steps F1, F2, F3 and F4 are re-executed. Thus, in zone A, inverter unit 115 outputs the driving frequency responding to the air conditioning load, and the inside of the room is air-conditioned sufficiently.

As stated above, when water in water tank 171 is exhausted, water in water receiver 161 is not regularly sprayed onto water-air cooled condenser 105, and thus, the temperature of water-air cooled condenser 105 tends to increase. The temperature of heat radiation plate 117 also is increased, as the temperature of water-air cooled condenser 105 increases. The detected temperature Tc of temperature sensor 125 corresponding to the temperature of refrigerant flowing through air-cooled condenser 107 also is increased and enters into the zone C from the zone A. Thus, the step F9 is selected in step F4, and the present output frequency f' is decreased by 20 (Hz). The decreased output frequency of inverter unit 115 is maintained for thirty seconds (in step F10). Water exhaustion indicating lamp 131 is simultaneously operated to inform the exhaustion of water in water tank 171 to the occupant (in step F11). Then, the above-described steps F1, F2, F3 and F4 are re-executed. With the above-described control operation, the detected temperature Tc of temperature sensor 125 decreases.

When the detected temperature Tc of temperature sensor 125 decreases and enters into the zone B from the zone C, the step F12 is selected in step F4. The present driving frequency f' of inverter unit 115 is maintained irrespective of the driving frequency Fout determined in step F2 (in step F12). Then, the above-described steps F1, F2, F3 and F4 are re-executed.

On the other hand, if the detected temperature Tc of temperature sensor 125 is rapidly increased despite the execution of the above-described control operation and reaches the zone D from the zone C, the driving frequency of inverter unit 115 is rendered zero (Hz) in step F13. Thus, compressor 103 is stopped. Simultaneously, abnormal state indicating lamp 133 is operated to inform the abnormal state of the refrigerating circuit 101 to the occupant (in step F14), and the control operation of control section 119 finally moves to a stand-by state.

As can be understood from the above-described embodiment, in a regular operation, water in water receiver 161 (water tank 171) is regularly sprayed onto water-air cooled condenser 105 and water-air cooled condenser 105 normally carries out its evaporating operation. The detected temperature Tc from temperature sensor 125 corresponding to the temperature of refrigerant flowing through water-air cooled condenser 105 does not increase beyond the predetermined limited value even if the driving frequency of inverter unit 115 is a maximum value. In such a normal operation state, if the water in water tank 171 is exhausted and the driving frequency of inverter unit 115 increases to the maximum value, water-air cooled condenser 105 can not normally carry out its evaporating operation because no water is supply to water-air cooled condenser 105. Water-air cooled condenser 105 is not sufficiently cooled and the detected temperature Tc from temperature sensor 125 increases beyond the predetermined limited value. Thus, the above-described exhaustion of water in water tank 171 and the maximum value of the output frequency of inverter unit 115 might result in mechanical trouble with compressor 103 or the thermal breakdown of switching elements of inverter unit 115. However, in the above-described embodiment, the detected temperature Tc from temperature sensor 125 is compared with predetermined different temperature values TC1, Tc2 and Tc3. Thus, the excessive temperature increase in water-air cooled condenser 105 and heat-radiation plate 117 on which the switching elements 115a of inverter unit 115 are mounted can be detected before the mechanical trouble of compressor 103 or the breakdown of switching elements of inverter unit 115 occurs. Water exhaustion indicating lamp 131 is operated and the driving frequency of inverter unit 115 is forcibly decreased. Compressor 103 is driven with the decreased driving frequency of inverter unit 115 continuously. This is because it is possible to carry out the continuous operation of compressor 103 without the mechanical trouble or the thermal breakdown of switching elements of inverter unit 115 if the air conditioning load is small. Since the driving frequency of inverter unit 115 is decreased when water in water tank 107 is exhausted, the operation of compressor 103 is continuously carried out within an operation range at which the refrigerating circuit 101 can be regularly performed by air-cooled condenser 107 and water-air cooled condenser 105 mainly using heat-exchange with air. Such an operation range is located between prescribed temperatures Tc1 and Tc2 shown in FIG. 13. Therefore, the possible operational period of the portable air conditioning apparatus of this embodiment is greatly extended, as compared with the conventional portable air conditioning apparatus in which the compressor is stopped when water in the water tank is exhausted. Furthermore, in this embodiment, the exhaustion of water in water tank 171 is indirectly detected by detecting temperature Tc above the prescribed temperature Tc2 shown in FIG. 13, and water exhaustion indicating lamp 131 is operated. Thus, a mechanical detecting element, e.g., float switch, which has a relatively low operational reliability with a high cost, is not required to detect the exhaustion of water in water tank 171. The switching elements 115a of inverter unit 115 radiate head during the operation. However, since heat radiation plate 117 on which the switching elements 115a of inverter unit 115 are mounted is fixed on air-cooled condenser 107, the switching elements 115a of inverter unit 115 are cooled effectively.

Figure 15:
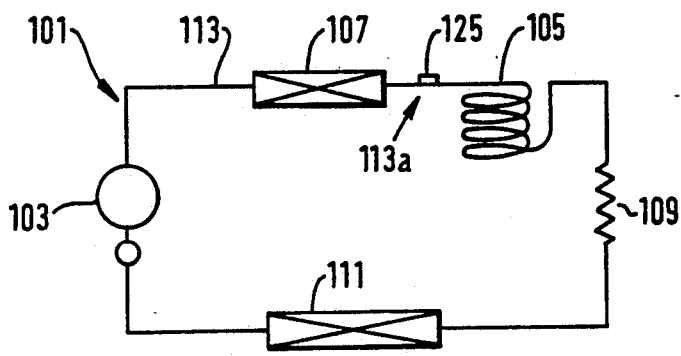
FIG. 15 is a schematic view illustrating the modification of the refrigerating circuit of the second embodiment.

In the above-described embodiment, the temperature of refrigerant at the high pressure side of the refrigerating circuit 101 is estimated by detecting the temperature Tc of heat radiation plate 117 mounted on air-cooled condenser 107. However, the temperature of refrigerant at the high pressure side of the refrigerating circuit may be estimated by detecting the temperature of refrigerant discharged from compressor 103 or the temperature of water-air cooled condenser 105. As shown in FIG. 15, temperature sensor 125 may also be mounted on a pipe 113a extending between the output side of air-cooled condenser 107 and the input side of water-air cooled condenser 105 to detect the temperature of refrigerant flowing between air-cooled condenser 107 and water-air cooled condenser 105. In addition, temperature sensor 125 may be located apart from water-air cooled condenser 105 to avoid influence of the water sprayed by spray device 155.

A third embodiment of the present invention will now be described with reference to FIGS. 16, 17, 18 and 19.

Referring to FIG. 16, a refrigerating circuit 201 of this embodiment includes a variable capacity compressor 203, a water-air cooled condenser 205, a capillary tube 207 and an evaporator 209 connected in series through a pipe 211. Water-air cooled condenser 205 is provided with a water spray 213. An inverter unit 215 is connected to a motor (not shown) of compressor 203 to control the rotational speed of the motor. The driving frequency output from inverter unit 215 is controlled by a control section 217. Actual room temperature sensor 219 is connected to control section 217. A temperature set unit 220 also is connected to control section 217 to input a desired room temperature into control section 217. A temperature sensor 221 mounted on water-air cooled condenser 205 is connected to control section 217. Temperature sensor 221 detects the temperature of water-air cooled condenser 203 to estimate the refrigerant temperature at a high pressure side of refrigerating circuit 201. An exhausting fan 223 is rotated by a fan motor 225 to generate a flow of air to water-air cooled condenser 205.

Figure 17:
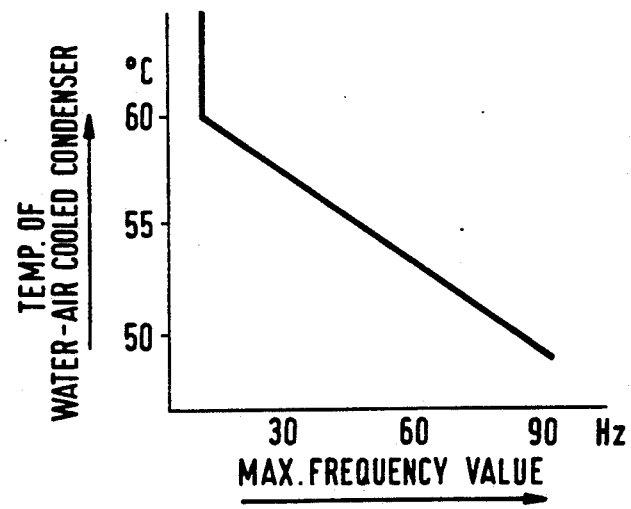
FIG. 17 is a graph showing a relationship between the temperature of the water-air cooled condenser and the driving frequency of the inverter unit of the portable type air conditioning apparatus of the second embodiment.

The above-described control section 217 is composed of a microcomputer and its peripheral circuits. Control section 217 includes a frequency control function 227, a maximum frequency determination function 229 and a fan motor control function 231. The operation of frequency control function 227 is similar to that of the first frequency control function 127 in the above-described second embodiment, and thus, a detail description thereof is not repeated. When control section 217 performs maximum frequency determination function 229, control section 217 determines a maximum frequency fed from inverter unit 215 on the basis of the temperature of water-air cooled condenser 205 detected by temperature sensor 221. As shown in FIG. 17, each maximum frequency value against changes in the temperature of water-air cooled condenser 205 is predetermined and a table of maximum frequency values and temperature changes of water-air cooled condenser 205 is stored in a memory (not shown) in control section 217 beforehand. Thus, control section 217 can easily determine a target maximum frequency corresponding to the temperature of water-air cooled condenser 205 by referring the above-described table stored in the memory in control section 217. If the driving frequency of inverter unit 215 determined by frequency control function 227 is greater than the target maximum frequency determined by maximum frequency determination function 229, the target maximum frequency is selected as a driving frequency output from inverter unit 215.

Figure 18:
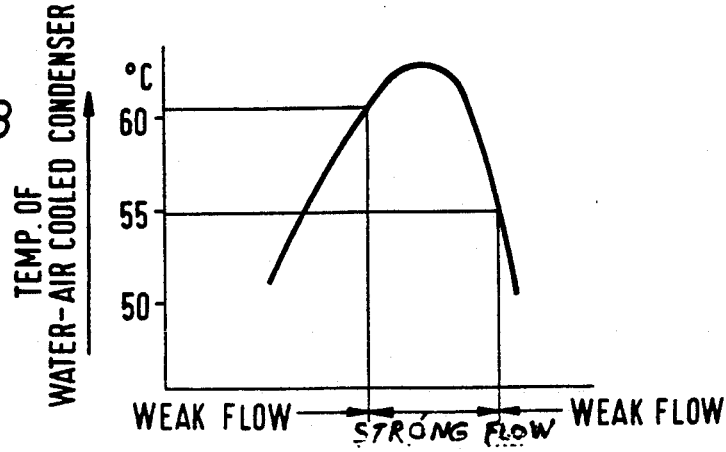
FIG. 18 is a graph showing a relationship between the temperature of the water-air cooled condenser and the rotational speed of the exhausting fan of the portable type air conditioning apparatus of the second embodiment.

When control section 217 performs fan motor control function 231, the rotational speed of fan motor 225 is controlled based on the temperature of water-air cooled condenser 205. A relationship between the rotational speed of fan motor 225 (exhausting fan 223) and the temperature of water-air cooled condenser 205 is shown in FIG. 18. This relationship also is stored in a memory (not shown) in control unit 217 in the form of a table. If the temperature of water-air cooled condenser 205 reaches 60 (° C.), the rotational speed of fan motor 225 is increased to change the flow of air generated by exhausting fan 223 from a weak flow to a strong flow. If the temperature of water-air cooled condenser 205 decreased below 55 (° C.), the rotational speed of fan motor 225 is decreased to change the flow of air generated by exhausting fan 223 from a strong to a weak flow. Thus, a suitable heat radiation effect responding to the temperature of water-air cooled condenser 205 can be obtained.

The mechanical arrangement of this embodiment is similar to that of the first embodiment, and therefore, the concrete construction thereof should be referred to FIGS. 3 and 4.

Figure 19:
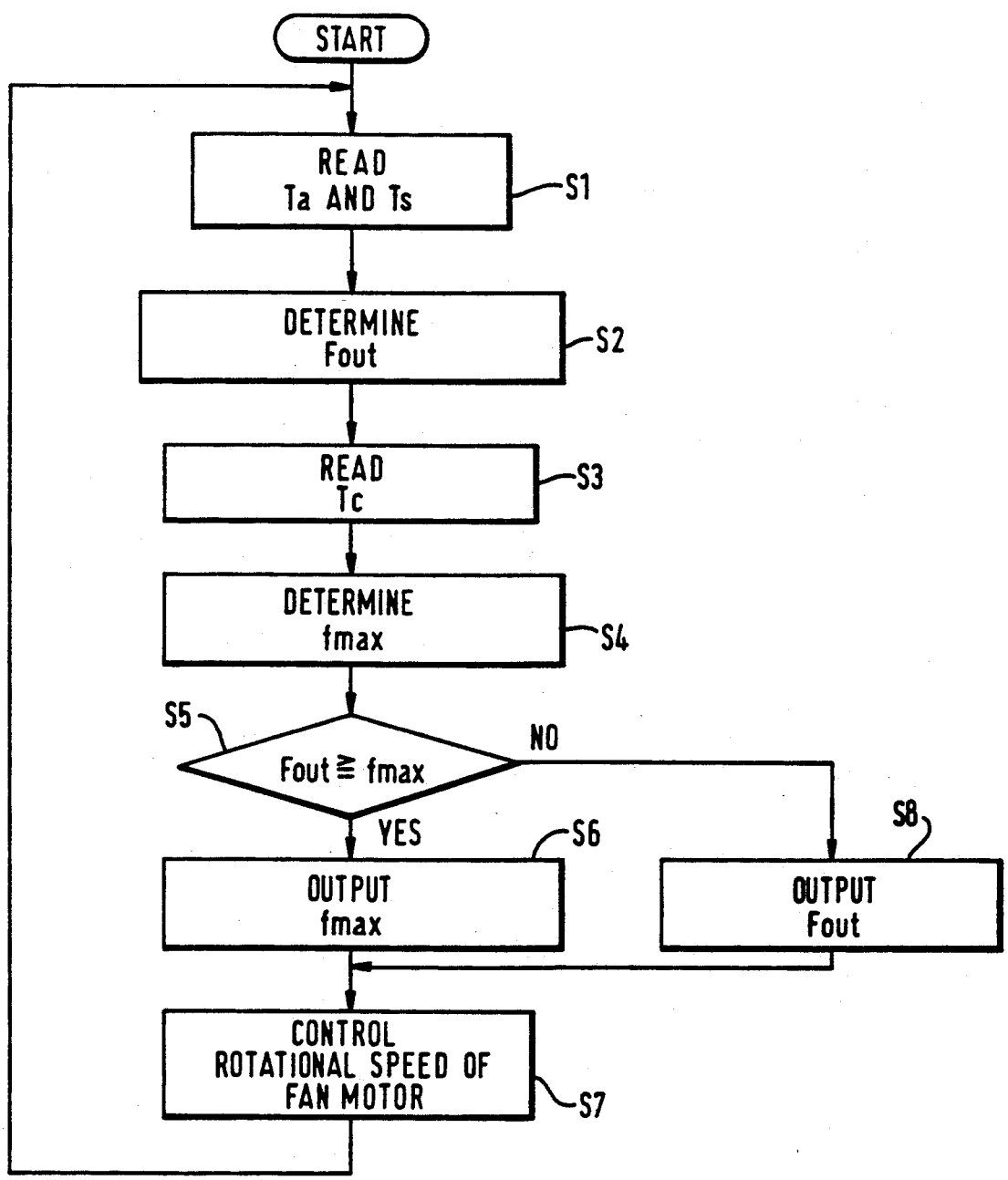
FIG. 19 is a flow chart showing the operation of the portable air conditioning apparatus of the third embodiment.

A control operation of the above-described embodiment will be described in more detail with reference to FIG. 19. When the operation of the air conditioning apparatus is started, a desired room temperature Ts from temperature set unit 220 and the actual room temperature Ta from actual room temperature sensor 219 are input into control section 217 (step S1). The driving frequency Fout of inverter unit 215 is selected from predetermined values, shown in the above TABLE in the second embodiment, by frequency control function 227 in accordance with the difference in temperature (air conditioning load) between desired room temperature Ts and actual room temperature Ta (step S2). In step S3, the temperature Tc of water-air cooled condenser 205 detected by temperature sensor 221 is input into control section 217. Based on the temperature Tc, a maximum frequency value fmax is determined by maximum frequency determination function 229 of control section 217 in step S4. The maximum frequency value fmax is compared with the above-described driving frequency Fout in step S5. If the driving frequency Fout is greater than the maximum frequency value fmax, the YES-path is taken. The driving frequency of inverter unit 215 is controlled at the maximum frequency value fmax in step S6. In addition, the rotational speed of fan motor 225 (exhausting fan 223) is controlled based on the temperature Tc of water-air cooled condenser S7, as shown in FIG. 18, in step S7. After that, the above-described steps S1, S2, S3, S4 and S5 are reexecuted.

If the NO-path is taken in step S5, the driving frequency of inverter unit 215 is controlled at the driving frequency Fout in step S8. Then, the above-described step S7 is executed.

With the above-described embodiment, the driving frequency of inverter unit 215 is controlled at the maximum frequency value fmax determined by the temperature Tc of water-air cooled condenser 205 if the driving frequency of inverter unit 215 corresponding to the air conditioning load exceeds the maximum frequency value fmax. Thus, the increase in the temperature Tc of water-air cooled condenser 205 is avoided and the excessive water consumption can be controlled. In addition, since the rotational speed of exhausting fan 223 is controlled in response to the temperature Tc of water-air cooled condenser 205, the heat radiation effect of water-cooled condenser 205 can be enhanced. Thus, the water consumption is decreased during the operation and the cooling operation of the air conditioning apparatus can also be maintained for some period even if water in the water tank is exhausted. Furthermore, if the air conditioning load in the room is small, a continuous operation of the air conditioning apparatus can be possible even if the water in the water tank has been exhausted.

According to the present invention, since the driving frequency output from the inverter unit is modified based on the temperature of the water-air cooled condenser, the water consumption sprayed to the water-air cooled condenser is controlled. Thus, the operation of the portable air conditioning apparatus can be extended even if water in the water tank has been exhausted. Furthermore, since the frequent operation of the pressure detecting switch is avoided because of the decrease in the driving frequency of the inverter unit responding to the increase in the temperature of the water-air cooled condenser, the frequent stopping of the operation of the portable air conditioning apparatus can be prevented.

The present invention has been described with respect to specific embodiments. However, other embodiments based on the principles of the present invention should be obvious to those of ordinary skill in the art. Such embodiments are intended to be covered by the claims.

What is claimed is:

1. A portable air conditioning apparatus comprising:
   means for determining an air conditioning load in a defined space to be air-conditioned;
   a refrigerating circuit having high and low pressure sides of refrigerant, including,
      variable capacity compressing means for compressing refrigerant, and
      condenser means associated with the variable capacity compressing means for condensing the refrigerant, the condenser means being cooled by water and air, a part of the water being evaporated by the heat of the condenser means;
   water supply means for supplying water to the condenser means;
   refrigerant temperature detecting means for detecting the temperature of refrigerant at the high pressure side of the refrigerating circuit, the temperature of the refrigerant increasing when the water in the water supply means is exhausted; and
   control means for forcibly decreasing the capacity of the variable capacity compressing means and maintaining the operation of the variable capacity compressing means irrespective of the air conditioning load when the temperature of the refrigerant at the high pressure side of the refrigerating circuit is greater than a prescribed value.

2. An apparatus according to claim 1, wherein the control means includes inverter means for supplying a target driving frequency corresponding to the air conditioning load to the variable capacity compressing means, and means for decreasing the target driving frequency output from the inverter means whereby the capacity of the variable capacity compressing means is decreased.

3. An apparatus according to claim 1, wherein the refrigerating circuit also includes second condenser means associated with the first condenser means for condensing the refrigerant, the second condenser means being cooled by air.

4. An apparatus according to claim 3, wherein the inverter means has switching elements, and the second condenser means includes a heat radiation plate on which the switching elements of the inverter means and the refrigerant temperature detecting means are mounted.

5. An apparatus according to claim 3, wherein the refrigerating circuit includes a pipe extending between the first condenser means and the second condenser means with the refrigerant temperature detecting means mounted thereon.

6. An apparatus according to claim 1 further including means for indicating the water exhaustion in the water supply means when the temperature of the refrigerant is greater than the prescribed value at the high pressure side of the refrigerating circuit.

7. A portable air conditioning apparatus comprising:
   means for determining an air conditioning load in a defined space to be air-conditioned;
   a refrigerating circuit having high and low pressure sides of refrigerant, including,
      variable capacity compressing means for compressing refrigerant, and
      condenser means associated with the compressing means for condensing the refrigerant, the condenser means being cooled by water and air, a part of the water being evaporated by the heat of the condenser means;
   water supply means for supplying water to the condenser means;
   refrigerant temperature detecting means for detecting the temperature of refrigerant at the high pressure side of the refrigerating circuit, the temperature of the refrigerant increasing when the water in the water supply means is exhausted; and
   control means for modifying the capacity of the compressing means and maintaining the operation of the compressing means when the temperature of the refrigerant at the high pressure side of the refrigerating circuit is greater than a prescribed value, wherein the control means includes inverter means for supplying a target driving frequency corresponding to the air conditioning load to the variable capacity compressing means, and means for forcibly decreasing the target driving frequency output from the inverter means irrespective of the air conditioning load when the temperature of the refrigerant is greater than the prescribed value at the high pressure side.

8. A portable air conditioning apparatus comprising:
   means for determining an air conditioning load in a defined space to be air-conditioned;
   a refrigerating circuit having high and low pressure sides of refrigerant, including,
      variable capacity compressing means for compressing refrigerant, and
      condenser means associated with the compressing means for condensing the refrigerant, the condenser means being cooled by water and air, a part of the water being evaporated by the heat of the condenser means;
   water supply means for supplying water to the condenser means;
   refrigerant temperature detecting means for detecting the temperature of refrigerant at the high pressure side of the refrigerating circuit, the temperature of the refrigerant increasing when the water in the water supply means is exhausted; and
   control means for modifying the capacity of the compressing means and maintaining the operation of the compressing means when the temperature of the refrigerant at the high pressure side of the refrigerating circuit is greater than a prescribed value, wherein the control means includes inverter means for supplying a target driving frequency corresponding to the air conditioning load to the variable capacity compressing means, means for determining a maximum driving frequency of the inverter means based on the detection result of the refrigerant temperature detecting means, and means for changing the target driving frequency output from the inverter means to the maximum driving frequency to extend the operation of the compressing means if the target driving frequency is greater than the maximum driving frequency.

9. An apparatus according to claim 8 further including variable speed fan means for generating a flow of air to the condenser means.

10. An apparatus according to claim 9 further including means for controlling the rotational speed of the fan means in response to the detection result of the refrigerant temperature detecting means.

11. A method for maintaining the operation of a portable air conditioning apparatus wherein a condenser cooled by water fed from a water tank and a flow of air generated by a fan device is used and a variable capacity compressor is driven by a variable driving frequency output from an inverter in response to an air conditioning load in a defined space even if the water in the water tank is exhausted, including the steps of:

reading out a desired room temperature Ts;
detecting an actual room temperature Ta;
determining the driving frequency output from the inverter based on the air conditioning load corresponding to the difference between the temperatures Ta and Ts;
detecting the temperature Tc of refrigerant at the high pressure side of a refrigerating circuit; and
forcibly decreasing the determined driving frequency by a predetermined value irrespective of the air conditioning load if the temperature Tc is greater than a prescribed value.

12. A method according to claim 11 further including the step of activating an indicating device to indicate the exhaustion of water in the water tank if the temperature Tc is greater than the prescribed value.

13. A method according to claim 11 further including the step of controlling the rotational speed of the fan device in response to the temperature Tc.

* * * * *